Oct. 24, 1950      W. ORVEDAHL      2,527,092
INDUCTION MOTOR CONTROL SYSTEM
Filed May 16, 1947
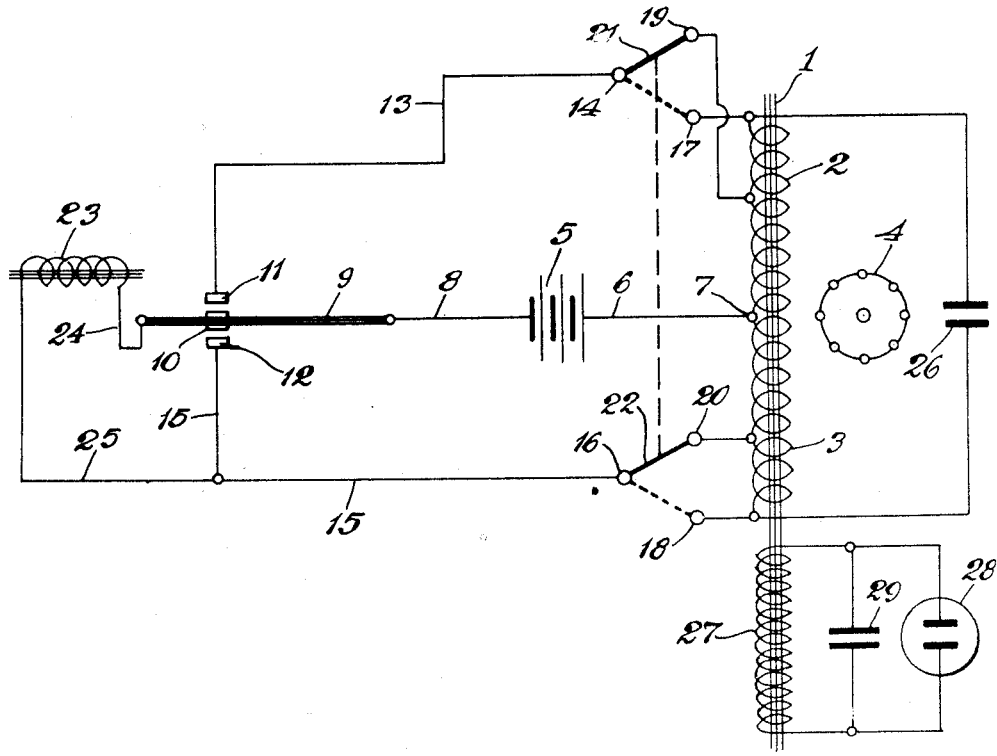
Inventor
Walter Orvedahl
by Parker & Carter
Attorneys Patented Oct. 24, 1950

2,527,092

UNITED STATES PATENT OFFICE 2,527,092

INDUCTION MOTOR CONTROL SYSTEM

Walter Orvedahl, Santa Fe, N. Mex., assignor to Control Devices, Inc., Santa Fe, N. Mex., a corporation of New Mexico Application May 16, 1947, Serial No. 748,614

2 Claims. (Cl. 171—97)

My invention relates to improvements in the use of direct current power supplies for the operation of an induction motor.

One object of my invention is to provide, in combination with an alternating current electric motor, means for operating and for controlling the operation of the motor from a direct current source.

Another object of my invention is to provide in an alternating current motor a plurality of field coils, each excited by a direct current with means for exciting first one coil and then the other so as to produce the effect on the rotor of an alternating current in a single field coil.

Another object is to provide, in combination with such special type of field coil winding, a secondary winding so that the field coil of the motor may serve both its primary function as motor field coil, and a secondary function as the primary coil of a transformer.

Another object is to provide in an electric motor field coil windings which have a dual function, in one case each winding passing direct current only, in the other case the two windings passing direct currents alternately in opposite directions, serving, in effect, as the primary coil to excite the secondary coil of a transformer.

Other objects will appear from time to time in the specification and claims.

My invention is primarily intended for use in connection with small-size, low-power alternating current motors, and is well adapted, for instance, for use in connection with the operation of luminous signs where a motor is used to move the moving element and at the same time alternating current is required to light the gaseous discharge tube.

My invention is illustrated more or less diagrammatically in the accompanying drawing, wherein:

1 is the field core of an alternating current motor. 2, 3 are field windings about the core. 4 is the rotor. 5 is a battery or other source of direct current. Conductor 6 leads from one terminal of the battery to the terminal 7, which is a terminal for each of the cores 2 and 3. Conductor 8 leads from the other terminal of the battery 5 to vibrator reed 9 which carries a contact member 10 adapted to vibrate between contact members 11 and 12. Conductor 13 leads from the terminal 11 to a terminal 14. Conductor 15 leads from the contact member 12 to a terminal 16. 17 and 18 are contact members in circuit, respectively, with the outboard ends of the coils 2 and 3. Contacts 19 and 20 are in electric circuit with equally spaced interior taps connected to the coils 2, 3. 21 is a switch member which may be positioned selectively to connect the contacts 14 and 19, or 14 and 17. 22 is a switch member similarly adapted to connect contact 16 with the contacts 18 or 20. 23 is the vibrator coil for the reed 9. There are thus parallel circuits from the battery 5 through the conductor 8, reed 9, conductor 24, conductor 25, conductors 13 or 15, contacts 14 or 16, switches 21 or 22, contacts 17 or 19, or 18 or 20, coil 2 or 3, tap 7, conductor 6, back to battery so that when the circuit is closed by the switch members 21, 22, the reed vibrates. As the reed vibrates, it closes a circuit through coil 2 or 3, never through both at the same time, and since these coils are wound in the same angular direction, the direct current of the battery passes through coils 2 and 3 in opposite directions so that while direct current always passes through coils 2 and 3, the effect on the magnetic field of the direct current passing through one coil or the other in opposite directions is just as if an alternating current were impressed on the core. This results in rotating the alternating current rotor in the usual way.

26 is a buffer condenser in parallel with the coils 2 and 3, which coils are in series. This buffer condenser has for its purpose to avoid sparking at the points 10, 11, 12.

27 is a coil superposed on the coils 2, 3. It is a secondary winding of fine wire, preferably wound over the motor winding, and excites, through the circuit as indicated, a gaseous discharge tube 28, the condenser 29 being in parallel with the discharge tube and the secondary coil. Under some circumstances this condenser 29 will be sufficient so that the buffer 26 may be omitted. Under other circumstances the secondary winding may be omitted, in which case the motor will operate in the usual manner. But when the secondary winding is present, the two direct current coils, with current superposed one on the other, with direct current passing in opposite directions alternately through them, serve as a primary coil of a transformer in exactly the same manner, insofar as its effect on the secondary coil is concerned, as if alternating current were passing through both coils.

The purpose of the switches 21, 22 is to control motor speed. These switches or other suitable circuit making-and-breaking mechanism may be used to vary the number of windings in the two coils 2 and 3 through which the direct current passes. The fewer the windings used, the higher the speed of the motor. Under ordinary circumstances, and when a light load as well as the motor load is being carried, the number of coils to be energized will be determined once and for all, and no change will be made because a change in the number of coils in the winding used would, of course, radically change the voltage in the secondary, though under some circumstances that would not be disadvantageous.

I claim:

1. In combination a source of direct current, a motor having at least two separate field coils, means for automatically switching the direct current through said coils in alternation, the direct current passing through each coil in a direction opposite to the path of travel in the other coil, a secondary coil wound about the two primary coils, and a work circuit including such secondary coil.

2. In combination a source of direct current, a motor having at least two separate field coils, means for automatically switching the direct current through said coils in alternation, the direct current passing through each coil in a direction opposite to the path of travel in the other coil, means for varying the effective length of each coil in unison to control motor operation, a secondary coil wound about the two primary coils, and a work circuit including such secondary coil.

WALTER ORVEDAHL.

REFERENCES CITED

The following references are of record in the file of this patent:

UNITED STATES PATENTS

| Number | Name | Date |
|---|---|---|
| 1,726,231 | Kennedy | Aug. 27, 1929 |
| 1,864,981 | Curtis | June 28, 1932 |
| 1,934,060 | Hanning | Nov. 7, 1933 |

FOREIGN PATENTS

| Number | Country | Date |
|---|---|---|
| 624,431 | France | Apr. 9, 1927 |